Figure 1:
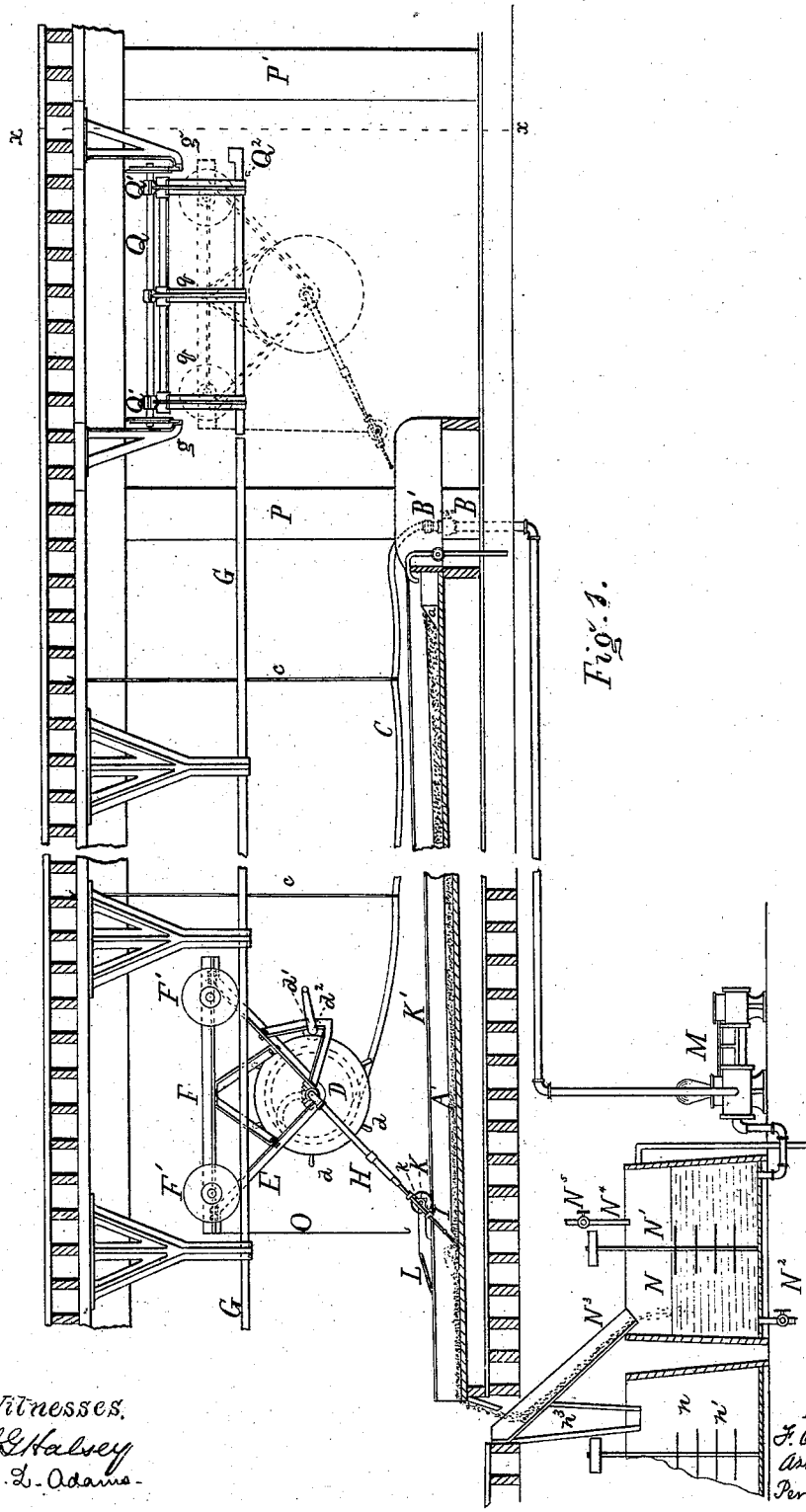

(No Model.) 4 Sheets—Sheet 1.

F. O. MATTHIESSEN & A. BEHR.
METHOD OF AND APPARATUS FOR EMPTYING STARCH TABLES.

No. 257,959. Patented May 16, 1882.

Witnesses.
W. G. Halsey
M. L. Adams

Inventors,
F. O. Matthiessen
Arno Behr
Per Edw. E. Quimby
Atty.

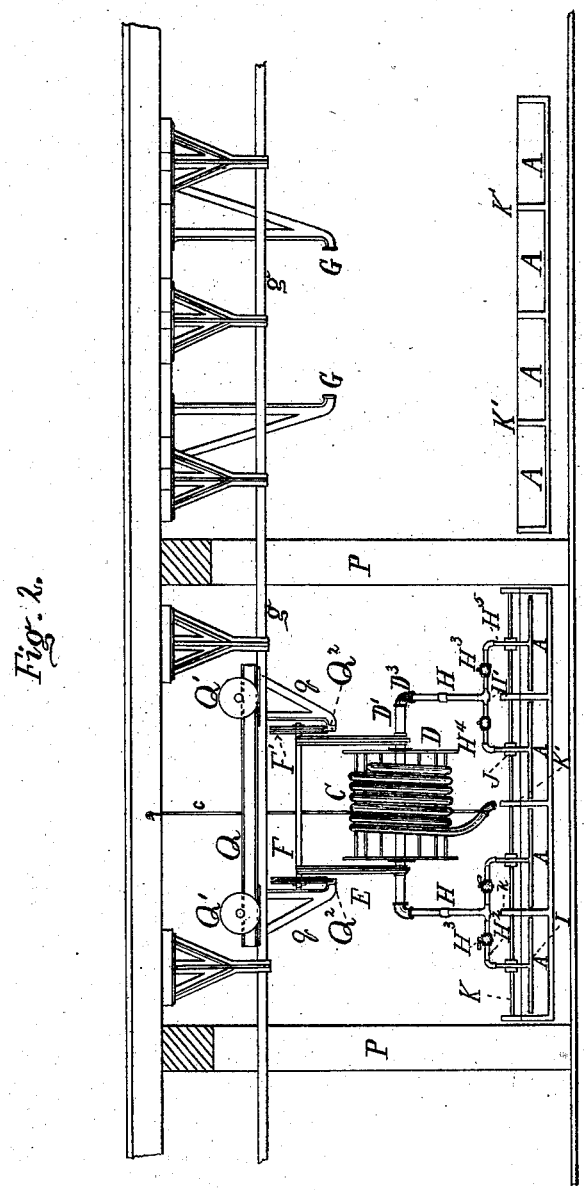

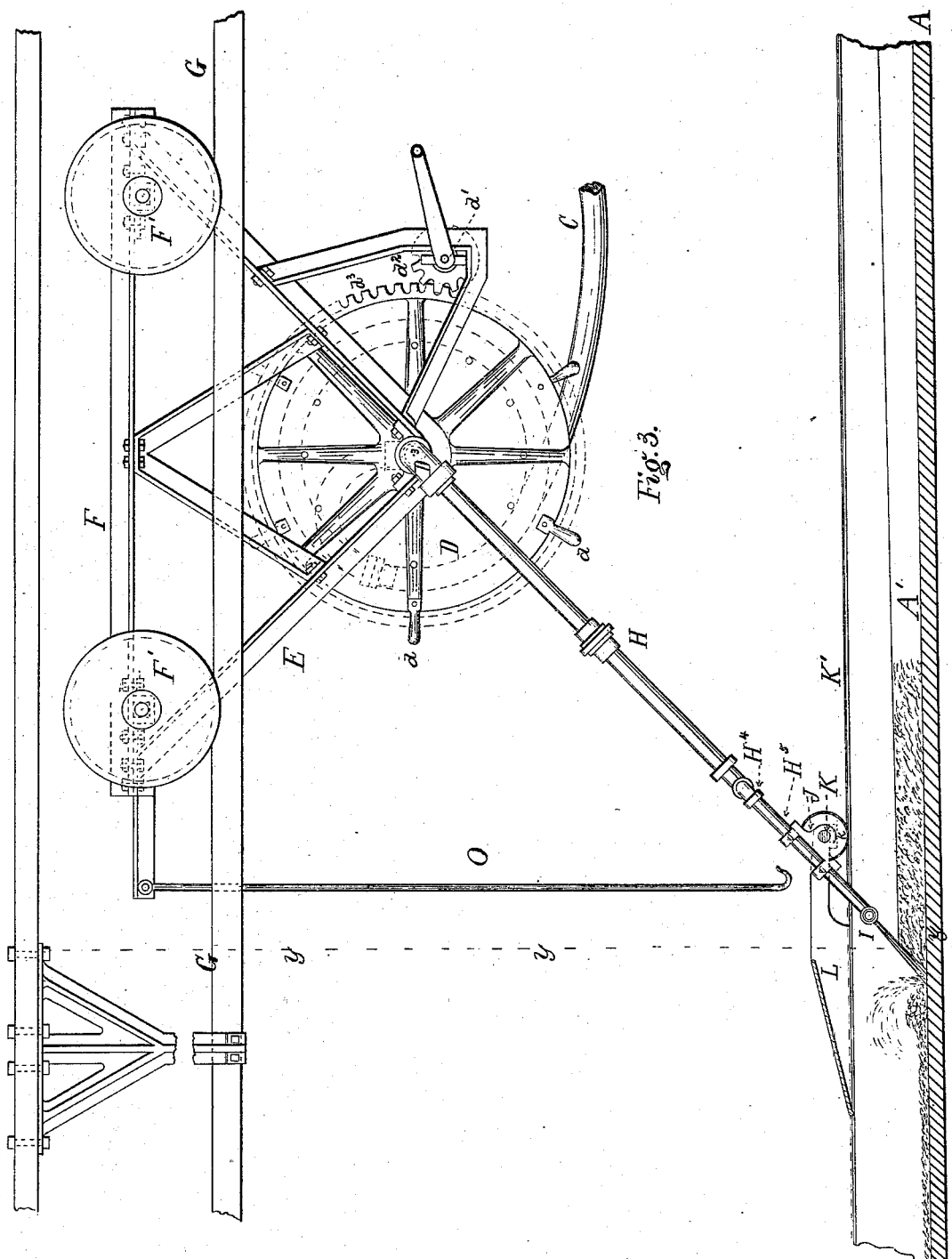

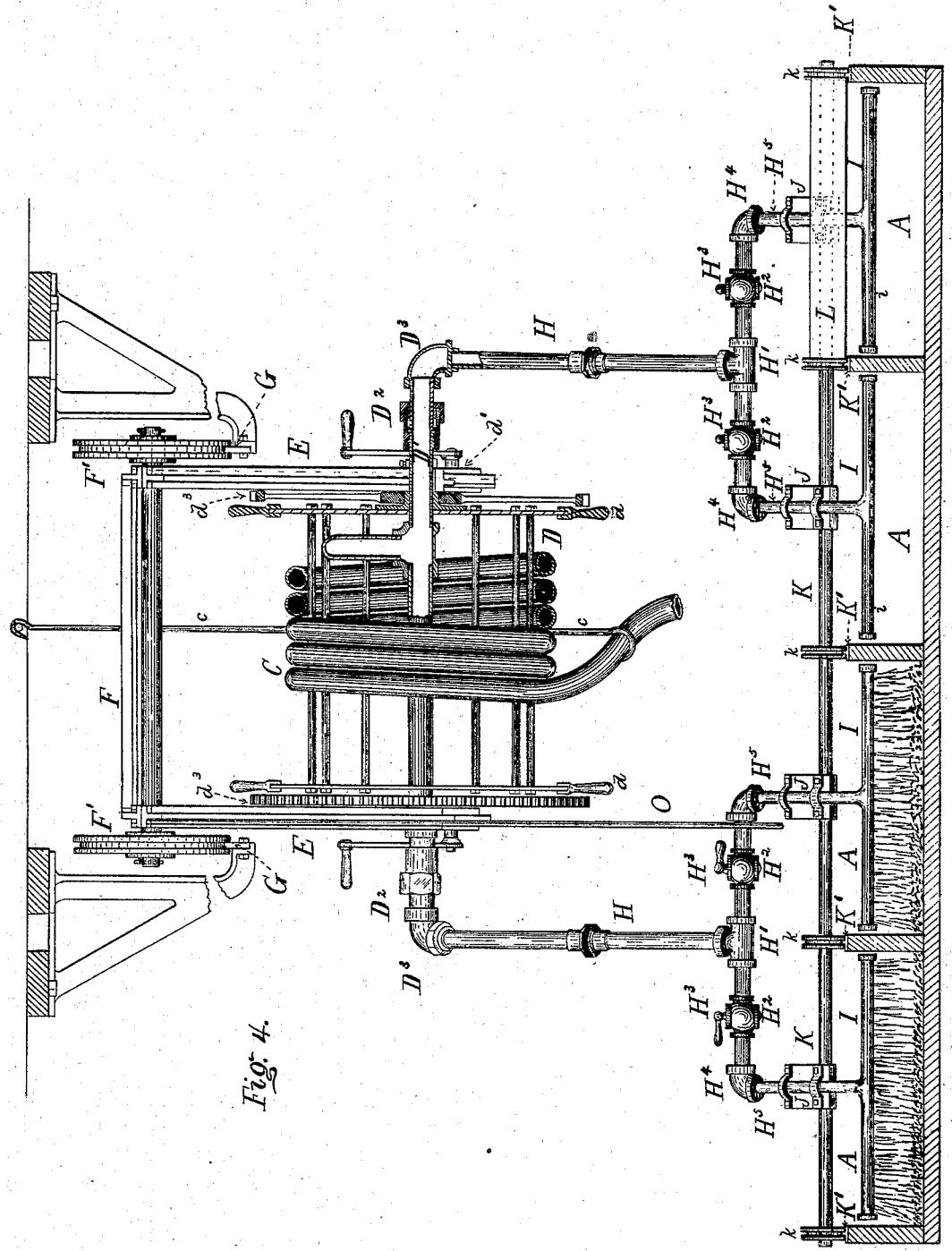

UNITED STATES PATENT OFFICE.

FRANZ O. MATTHIESSEN, OF IRVINGTON, NEW YORK, AND ARNO BEHR, OF JERSEY CITY, NEW JERSEY, ASSIGNORS TO THE CHICAGO SUGAR REFINING COMPANY, OF CHICAGO, ILLINOIS.

METHOD OF AND APPARATUS FOR EMPTYING STARCH-TABLES.

SPECIFICATION forming part of Letters Patent No. 257,959, dated May 16, 1882.

Application filed March 23, 1882. (No model.)

*To all whom it may concern:*

Be it known that we, FRANZ O. MATTHIESSEN, of Irvington, New York, and ARNO BEHR, of Jersey City, New Jersey, have invented an Improved Method of and Apparatus for Emptying Starch-Tables, of which the following is a specification.

In the ordinary method of manufacturing starch the raw starch-liquor is run over a long slightly-inclined trough or so-called "starch-table," upon the bottom of which there is formed a deposit of starch. Owing to the tenacious character of this deposit, and its adhesion to the bottom and sides of the trough, it is removed therefrom with considerable difficulty, usually by means of shovels or scoops. This operation is tedious and laborious, and the surface of the starch-table is liable to injury by the abrasion of the shovels employed.

It is the object of our invention to effect the removal of the starch deposit from the trough or so-called "starch-table" without the use of shovels and without injury to the table. We accomplish this result by means of powerful jets of water, which are projected preferably in an inclined direction downward upon the starch deposit from a suitably-perforated movable pipe or washer, provided with a shield to prevent the spattering of the liquid over the outside of the trough. If it be desired not to too greatly dilute the starch with water, we employ clear water only at the commencement of the operation, and thereafter supply the washer with the liquid pumped from the tank which receives the overflow from the lower end of the trough. This tank we preferably provide with a stirrer, in order that the starch shall not settle solidly therein, but shall remain in mixture with the water, so that it can be discharged from the tank by its own gravity through a pipe at the bottom thereof to other tanks or vats wherein it is to be subjected to the subsequent operations involved in the manufacture of starch or of glucose, grape-sugar, or other products, as the case may be.

Our invention also includes an arrangement of elevated tracks and suspended carriages, by means of which our washing apparatus is moved over the troughs in a lengthwise direction, and is transferred from one set of troughs to another.

In the accompanying drawings, representing a portion of a starch-factory containing apparatus embodying our improvements and adapted for the performance of our process of emptying starch-troughs, Figure 1 is a vertical section of a portion of a building, showing a part of the room in which the starch-tables are located, and showing, in side elevation, the apparatus for washing the starch, and the suspended tracks for the hose-carriage, also showing the tanks into which the fluid from the starch-tables is discharged, and the pump for pumping such fluid back into the washing apparatus. Fig. 2 is a transverse vertical section of the starch-table room, taken through the line $x\ x$ on Fig. 1. Fig. 3 is a side elevation, upon an enlarged scale, of our starch-washing apparatus, showing a portion of the table in longitudinal vertical section, and including a side view of the hose-carriage and the washing apparatus, together with a portion of the track upon which the carriage moves over the table in a longitudinal direction. Fig. 4 is a transverse vertical section of the table, taken through the line $y\ y$ on Fig. 3, showing the hose-carriage and washing apparatus, partly in front elevation and partly in vertical section through the center of the shaft of the drum upon which the hose-pipe is coiled.

The apparatus shown in the drawings is adapted to effect the simultaneous washing of four adjoining starch tables or troughs, A A A A. The water or mixture of starch and water for washing the starch from the troughs is supplied through the service-pipe B to the flexible pipe or hose C, coiled upon the drum D. One end of the flexible pipe C is connected with the end B' of the service-pipe, and the other end is connected with the hollow shaft D' of the drum. The hollow shaft D' of the drum D has its bearings in the downwardly-projecting frame E of the hose-carriage F, the wheels F' of which, during the operation of washing out the starch, travel upon the longitudinal suspended tracks G. The hollow shaft D' projects outside of its bearings at either end, and is connected by a swiveljoint, D², and elbow-coupling D³ with the downwardly-inclined pipe H, the lower end of which is connected by means of the T-coupling H' to the horizontal pipes H², each provided with the stop-cocks H³, and connected by the elbow-couplings H⁴ with the inclined pipes H⁵, the lower ends of which are connected with the middle of the washers or spraying-pipes I, each of which extends transversely across one of the troughs, and is provided with either a narrow longitudinal slit or a row of closely-placed perforations, $i$. The starch troughs or tables A A A A have the usual inclination, and each trough has its upper end wall, $a$, upwardly and outwardly inclined, in order to facilitate the complete washing out of the starch therefrom. The inclined pipes H⁵ are clamped to the journal-boxes J of the horizontal shaft or axle K, to which are attached the grooved wheels K, which travel upon the rails K', fastened upon the top of the side walls of the troughs. For each spraying-pipe there is provided a shield, L, which is loosely hung upon the shaft K and projects forward and rests upon the edges of the rails K' on either side of the trough. Liquid is supplied to the service-pipe B either from an elevated reservoir or directly from the pump M, which draws the supply of liquid from the receiving-tank N, in which the liquid overflowing from the lower end of the trough or troughs is received.

In operation starch settles upon the bottom of each trough, forming the deposit A', which is thickest at the higher end of the trough and gradually diminishes in thickness, as will be seen, toward the lower end. In washing the settled starch from the tables the density of the resulting mixture of starch and water can be regulated by the amount of fresh water used. For example, a mixture of a density of 12° Baumé may be made by using a quantity of fresh water equal to about double the volume of the starch settled upon the table. The required quantity of water in any case may at the beginning of the operation be introduced into and measured in the tank from which the pump M draws its supply.

In emptying the starch-table the washer is placed near the lower end of the trough in such a position as to project a jet or jets of water outwardly and downwardly, as shown, upon the bottom of the trough. The jet or jets of water thus projected cut away the starch from the deposit upon the bottom of the trough, and as that operation is performed the washer is gradually moved toward the upper end of the trough. When the starch has been entirely washed out of the trough the washer is removed, and the raw starch-liquor again discharged upon the trough in order to form a new deposit.

The receiving-tank N is provided with a stirrer, N', by the operation of which the fluidity of the mixture is maintained, so that it can be drawn off by its own gravity through the discharge-pipe N² from the bottom of the receiving-tank, and conducted to any other tank or vat for such subsequent treatment as is desired. The mixture of starch and water is conducted from the trough to the receiving-tank N by the removable chute N³. Fresh water is supplied to the tank N by the service-pipe N⁴, provided with the valve N⁵. Another receiving-tank, $n$, provided with a stirrer, $n'$, and with a removable chute, $n^3$, for receiving the overflow from the starch-trough, may also, if desired, be employed.

The drum D is provided with the radially-projecting handles $d$ for convenience of turning it to uncoil the hose C; but to coil up the hose when the spraying apparatus is in operation we provide on either or both sides of the frame E a crank-shaft, $d'$, carrying a pinion, $d^2$, which meshes into a large gear, $d^3$, keyed to the hollow shaft D' of the drum.

The forward end of the carriage F is provided on each side with a pivoted hook, O, upon which the horizontal shaft K is hung when it is desired to lift the spraying apparatus clear of the troughs.

Detachable hooks $c$ are provided for the support of the uncoiled hose C from the ceiling, if desired.

The drawings represent a starch-trough room of a factory in which the troughs, arranged in groups of four, occupy the spaces between the rows of vertical columns or posts P. These spaces are called "bays," and extend across the floor of the room in the direction of its length.

Our invention includes devices for transferring our washing apparatus from one bay to another. We accomplish this by means of the transfer-carriage Q, mounted upon the wheels Q', which travel upon transfer-rails $g$, suspended from the ceiling, and extending transversely across the room in the space between the columns P and P', adjoining the upper end of the troughs.

The transfer-carriage Q is provided at both ends with the depending brackets $q$, supporting the parallel horizontal rails Q².

To effect the transfer of the washing apparatus, the transfer-carriage Q is brought to rest with the parallel rails Q² in alignment with the longitudinal rails G. The flexible pipe C is then coiled up upon the drum D and uncoupled from the service-pipe. The carriage F is then run from the rails G onto the rails Q² of the transfer-carriage, and the washing apparatus is lifted clear of the troughs and suspended by depositing the horizontal shaft K in the hooks O, pivoted to the carriage F. The transfer-carriage is then moved along until it is brought opposite to the longitudinal rails of the bay to which the washing apparatus is to be transferred, and the shaft K, being released from the hooks O, is lowered so that its wheels $k$ lodge upon the rails lying along the tops of the sides of the troughs. The carriage F is then run from the transfer-carriage down to the lower end of the longitudinal rails over the group of troughs which are to be washed, and the hose is uncoiled from the drum and coupled to the service-pipe belonging to the bay where the apparatus is to be operated.

It will be seen that by this organization of elevated rails and carriages a single washing apparatus can be employed for a large number of groups of troughs.

We claim as our invention—

1. The method of removing starch from starch-tables herein described, which consists in projecting upon the starch deposit a suitably-inclined jet or jets of liquid from a movable washer supplied through a flexible pipe either with pure water or with a mixture of starch and water, substantially as and for the purposes set forth.

2. In apparatus for effecting the removal of the deposits of starch from adjoining starch-tables, the spraying or jet pipes I and their pipe-connections with suitable means for supplying them with water or other liquid, and the shields L, carried upon the shaft or axle K, provided with the wheels $k$, in combination with the sides of the starch-troughs A, preferably provided with the rails K', as and for the purpose set forth.

3. The elevated tracks G, the hose-carriage F, the drum D, provided with the hollow shaft D', the spraying-pipes I and their pipe-connections with the opposite ends respectively of the hollow shaft D', in combination with the flexible pipe C, connected at one end with the hollow shaft D' of the drum and at its opposite end with the service-pipe B, as and for the purpose set forth.

4. The elevated tracks G, arranged longitudinally over the starch-tables, washing apparatus, substantially such as described, and the hose-carriage F and the transfer-carriage Q, provided with the rails $Q^2$, in combination with the transfer-rails $g$, for effecting the transfer of the washing apparatus from one group of starch-tables to another, substantially as set forth.

F. O. MATTHIESSEN.
ARNO BEHR.

Witnesses:
M. L. ADAMS,
W. G. HALSEY.